(12) United States Patent
Gates

(10) Patent No.: US 9,204,619 B2
(45) Date of Patent: Dec. 8, 2015

(54) PASSIVE ANIMAL FEEDER HAVING FEED TROUGHS INCLUDING A TRAY PORTION

(71) Applicant: All Seasons Feeders, Ltd., San Antonio, TX (US)

(72) Inventor: Burnell Gates, San Antonio, TX (US)

(73) Assignee: All Seasons Feeders, Ltd., San Antonio, TX (US)

( * ) Notice: Subject to any disclaimer, the term of this patent is extended or adjusted under 35 U.S.C. 154(b) by 21 days.

(21) Appl. No.: 14/244,009

(22) Filed: Apr. 3, 2014

(65) Prior Publication Data

US 2014/0230736 A1 Aug. 21, 2014

Related U.S. Application Data

(63) Continuation-in-part of application No. 12/290,387, filed on Oct. 30, 2008, now Pat. No. 8,689,737.

(51) Int. Cl.
*A01K 5/00* (2006.01)
*A01K 5/02* (2006.01)

(52) U.S. Cl.
CPC .................... *A01K 5/0225* (2013.01)

(58) Field of Classification Search
CPC ............................ A01K 5/0225; A01K 39/012
USPC ............... 119/53, 53.5, 54, 57.1, 57.4, 57.91, 119/61.2
See application file for complete search history.

(56) References Cited

U.S. PATENT DOCUMENTS

| | | | |
|---|---|---|---|
| 2,667,858 A | * | 2/1954 | Cussotti .................... 119/52.1 |
| 3,034,480 A | | 5/1962 | French |
| 3,962,997 A | | 6/1976 | Ruth |
| 4,582,023 A | | 4/1986 | Zumbahlen et al. |
| 4,892,060 A | * | 1/1990 | Lundquist .................... 119/52.2 |
| 4,986,220 A | | 1/1991 | Reneau et al. |
| 5,066,388 A | | 11/1991 | Ross |
| 5,069,164 A | | 12/1991 | Wiwi |
| 5,143,289 A | | 9/1992 | Gresham et al. |
| 5,259,337 A | | 11/1993 | Rasmussen |
| 5,333,572 A | | 8/1994 | Nutt |
| 5,503,090 A | | 4/1996 | Guzan |
| 5,855,943 A | | 1/1999 | Lush et al. |
| 5,862,777 A | | 1/1999 | Sweeney |
| 5,967,083 A | | 10/1999 | Kleinsasser |
| 6,199,509 B1 | | 3/2001 | Mostyn et al. |
| 6,510,813 B1 | | 1/2003 | Boone, Jr. |
| 6,722,311 B1 | | 4/2004 | Sides et al. |
| 6,763,781 B1 | | 7/2004 | Norrell |
| 6,899,056 B1 | | 5/2005 | Kelly |
| 6,920,841 B2 | | 7/2005 | Meritt |
| 6,920,842 B1 | | 7/2005 | Davis |
| 7,175,103 B1 | | 2/2007 | Barley |
| 7,222,583 B2 | | 5/2007 | Foster et al. |
| 7,302,912 B2 | | 12/2007 | Boyer |
| 7,370,605 B2 | | 5/2008 | Meritt |
| 7,404,376 B2 | | 7/2008 | Hernandez |

(Continued)

*Primary Examiner* — Yvonne Abbott-Lewis

(74) *Attorney, Agent, or Firm* — Klemchuk LLP; Kirby B. Drake

(57) ABSTRACT

A wildlife feeder having a hopper, a manifold, and a removed head at a removed end of the manifold. The hopper is designed to enclose particulate feed, such as corn, for dispensing through the manifold and head to wildlife. The head has a multiplicity of feed troughs and each feed trough has an angled top wall and an angled bottom wall, angled with respect to a longitudinal axis of the manifold and a plane of a tabular floor of the head.

19 Claims, 24 Drawing Sheets

(56) References Cited

U.S. PATENT DOCUMENTS

| | | | |
|---|---|---|---|
| D681,883 S * | 5/2013 | Meritt | D30/121 |
| 8,689,737 B2 * | 4/2014 | Gates | 119/53 |
| 2006/0048712 A1 * | 3/2006 | Boyer | 119/57.91 |
| 2006/0060148 A1 * | 3/2006 | Boyer | 119/57.91 |
| 2006/0283396 A1 | 12/2006 | Hernandez | |
| 2008/0257270 A1 | 10/2008 | Stankard et al. | |
| 2009/0120369 A1 | 5/2009 | Lewis | |

* cited by examiner

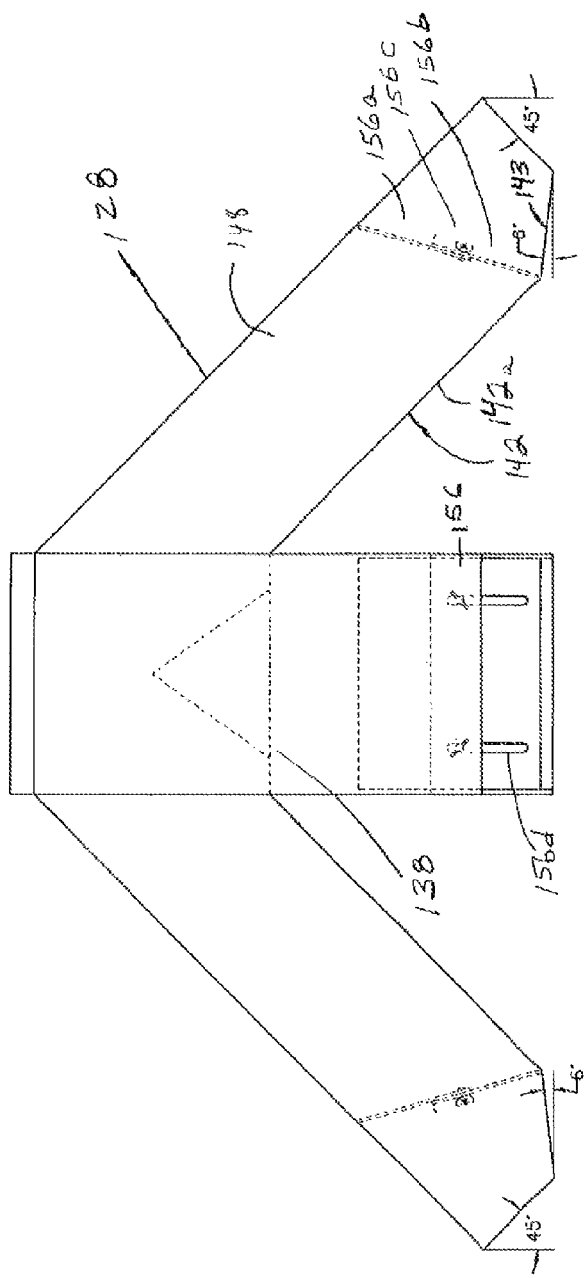

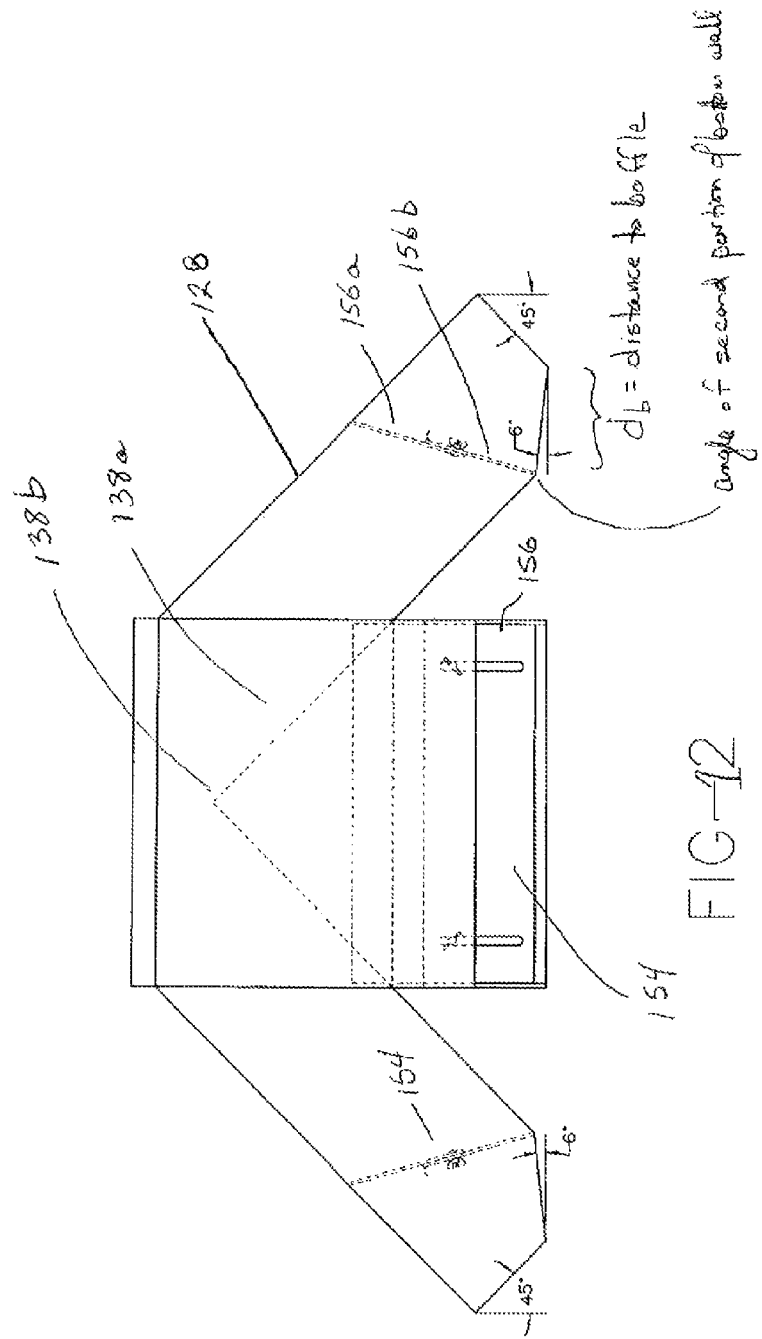

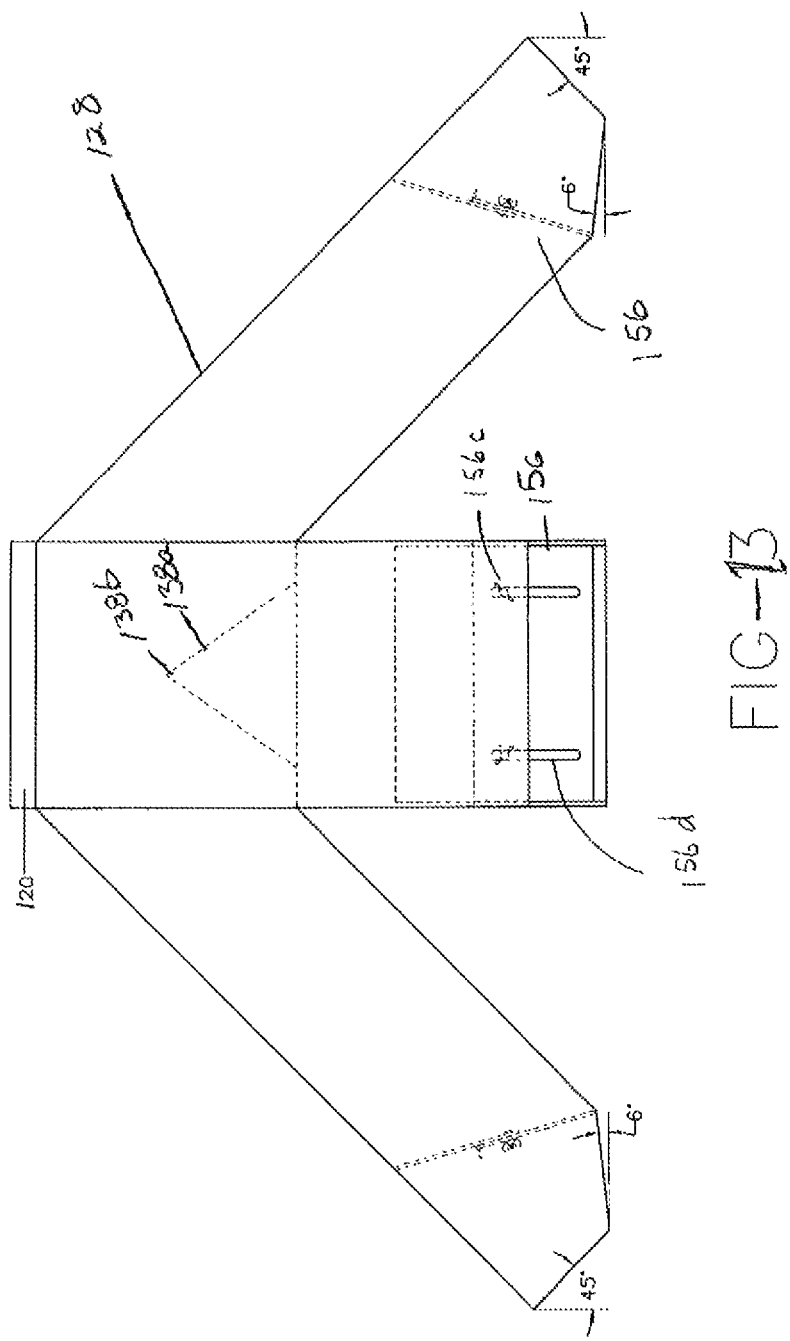

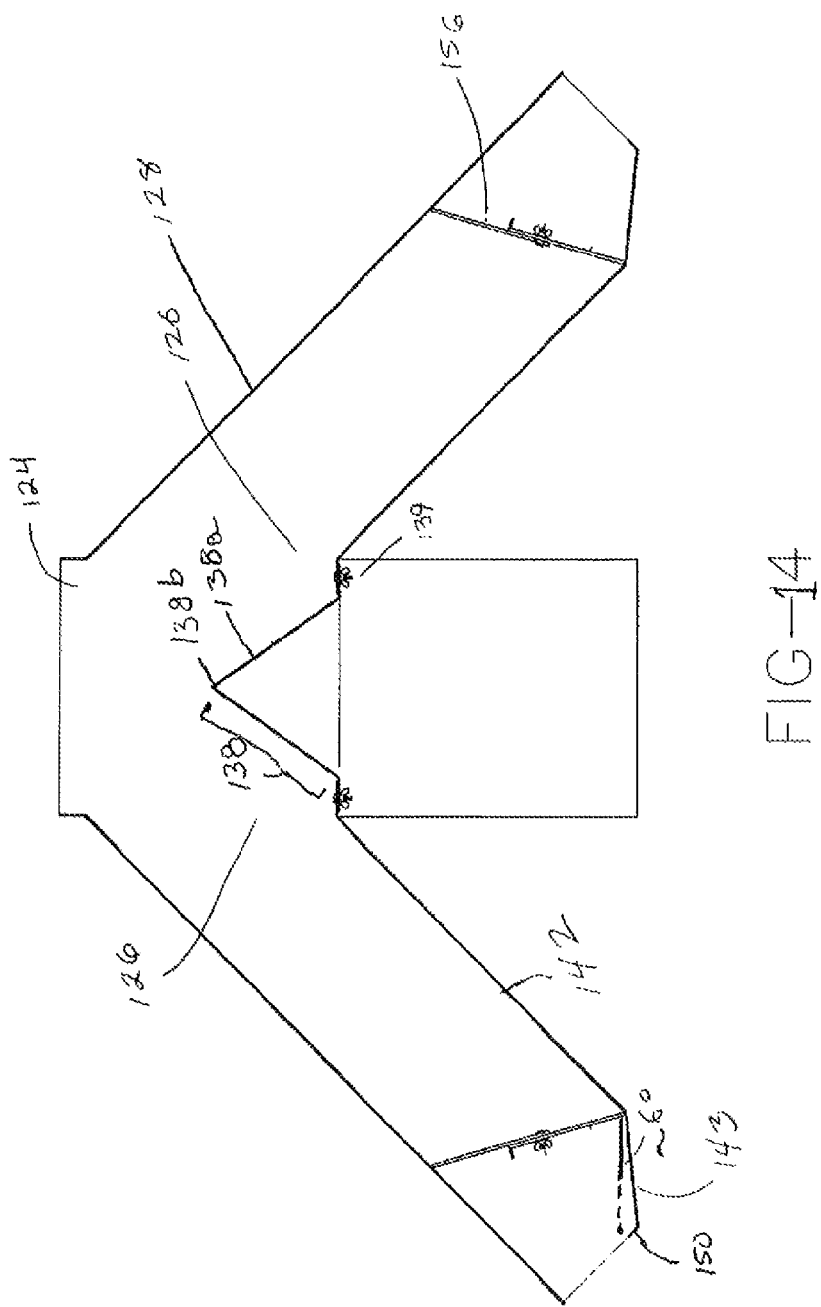

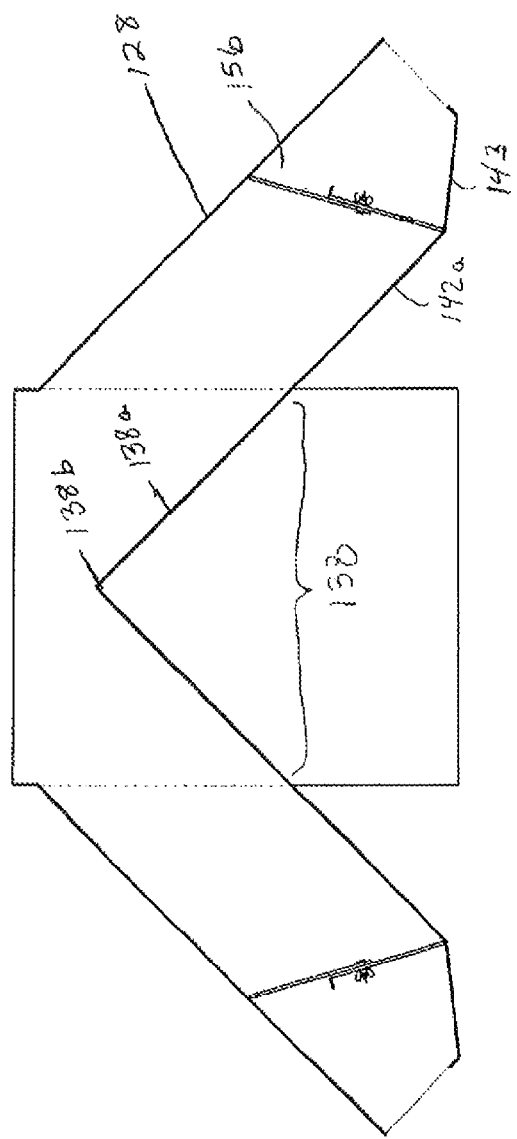

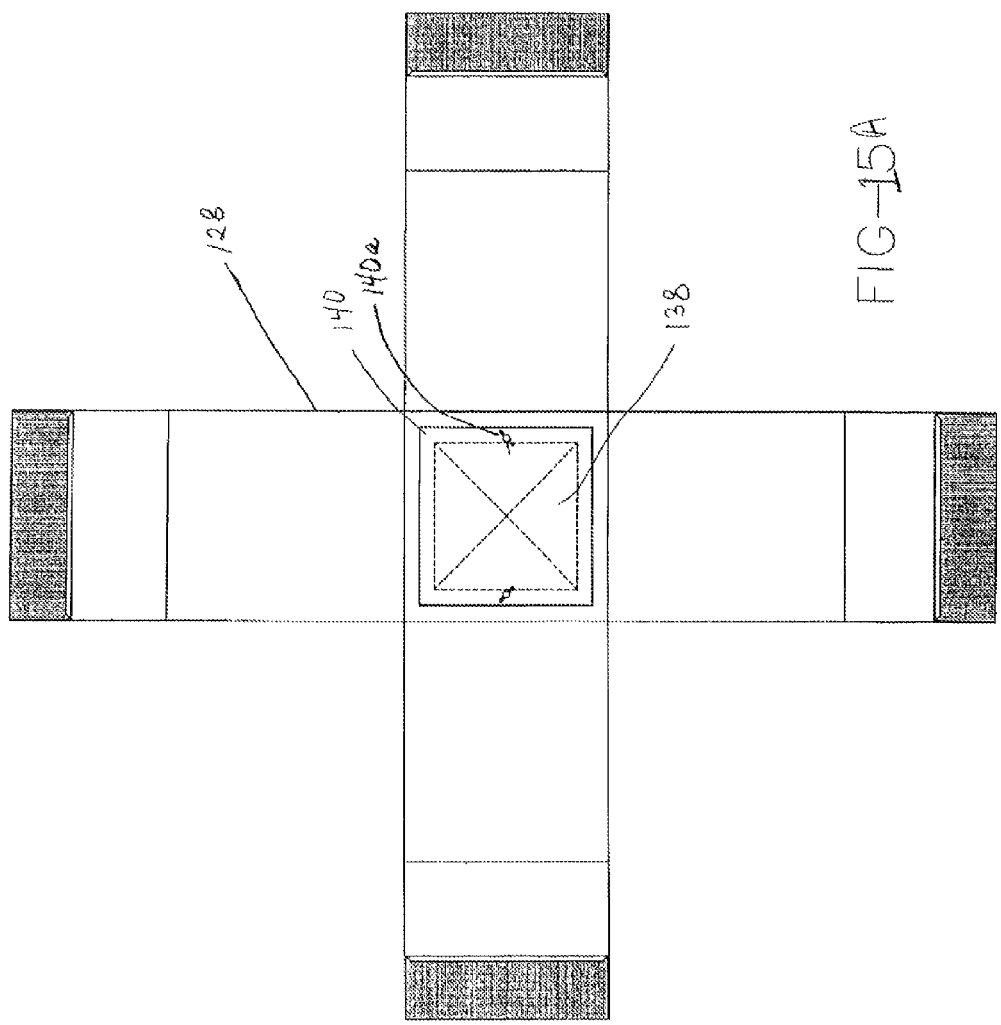

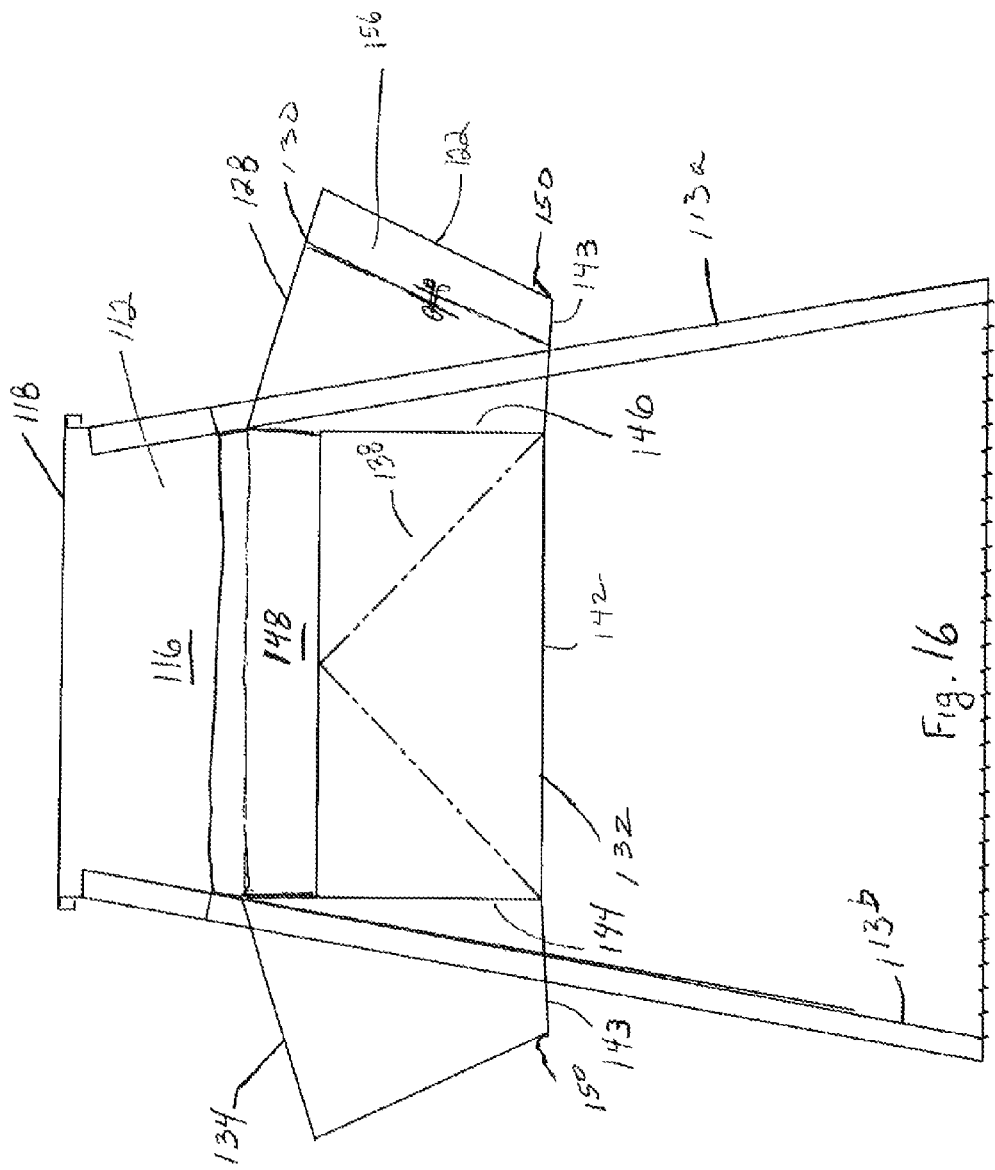

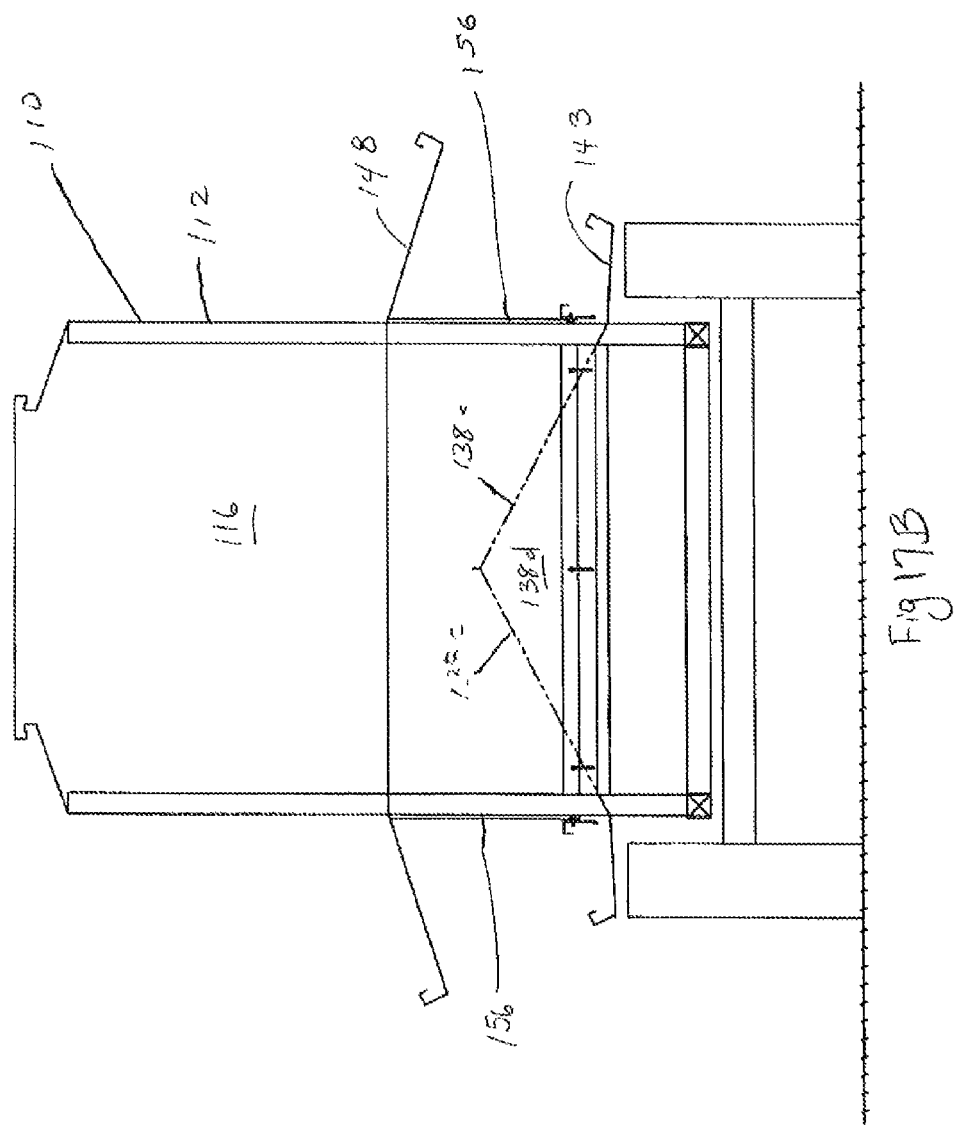

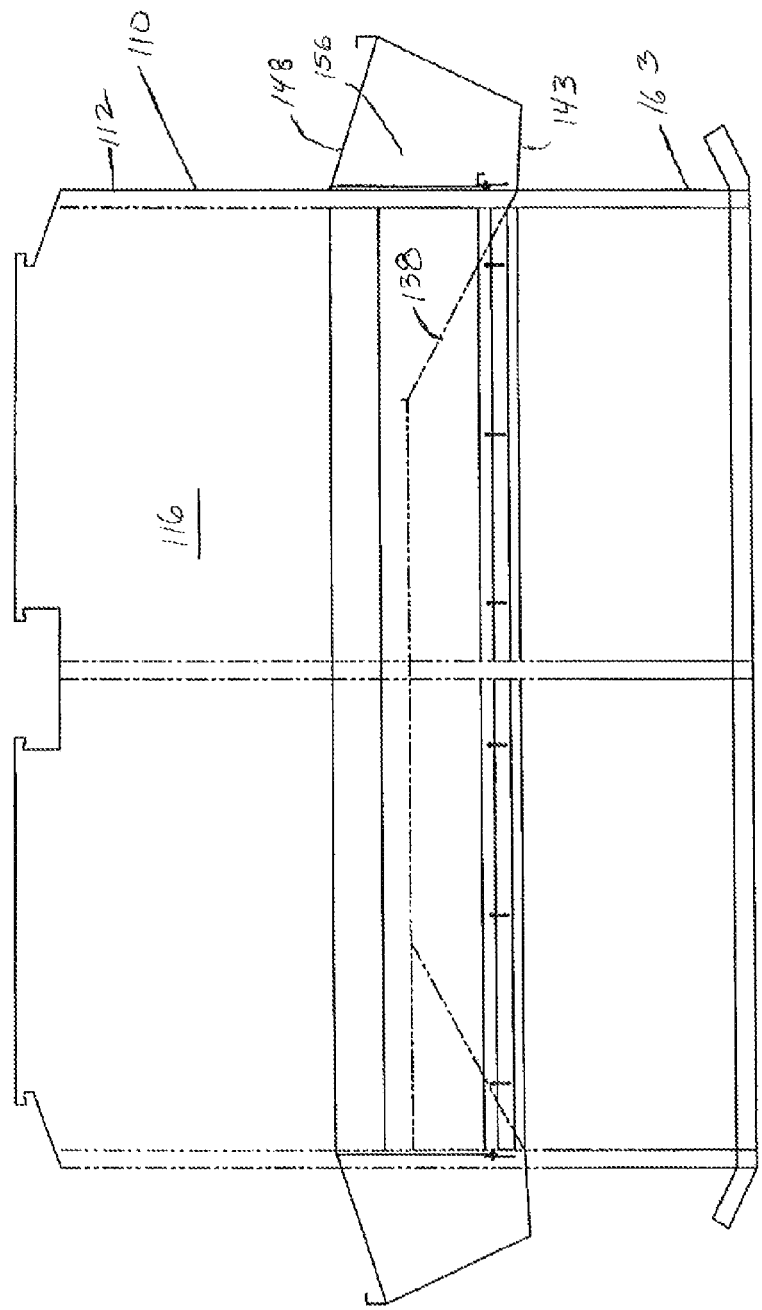

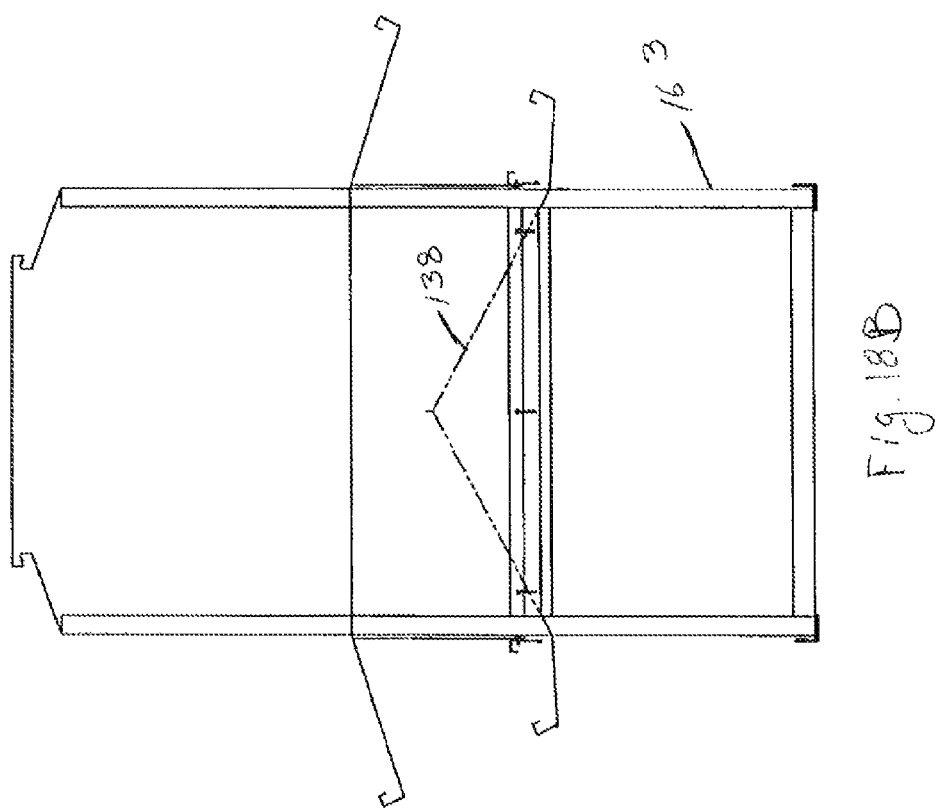

PASSIVE ANIMAL FEEDER HAVING FEED TROUGHS INCLUDING A TRAY PORTION

This application claims priority from and is a continuation-in-part of U.S. application Ser. No. 12/290,387, filed Oct. 30, 2008, now U.S. Pat. No. 8,689,737, and incorporates the same by reference.

FIELD OF THE INVENTION

Animal feeders, namely, animal feeders including a hopper, a cleanout manifold, and a dispensing head.

BACKGROUND

Animal feeders, including wildlife feeders, dispense feed, typically pelletized, grandular, and particulate feed, such as corn, soybeans, and nutritional supplements.

Wildlife feeders may be passive, wherein a hopper delivers particulate feed to animals through a multiplicity of tubes or passages under the impetus of gravity. Some of the tubes are designed for access by the muzzle of a deer, elk, cattle or the like.

Other wildlife feeders are active, having electrical motors operated on timers, which periodically cast feed. With most casting type feeders, the animals simply eat the food from the ground.

There has been a need for a passive wildlife or domesticated animal feeder which allows access to the feed in a head spaced below a hopper, while at the same time protecting exposure to harsh atmospheric forces (wind, rain, sleet, snow, direct sunlight, etc.) and the feed from "unwanted" critters (raccoons, squirrels, rodents, etc.), for which the feed is not intended. The outdoor environment in which wildlife feeders are placed includes exposure to elements which may deteriorate feed, and exposure to clever animals, which may deplete the feed intended for deer or the like.

While most prior art wildlife feeders have hoppers and feed troughs which keep the available feed well above the ground, critters and weather create problems, including wet feed and deletion of feed stores.

OBJECTS OF THE INVENTION

It is an object of this invention to provide a novel wildlife feeder which helps overcome some of the shortcomings of the prior art passive feeders, including components which cooperate to protect the feed from the outdoor environment.

SUMMARY OF THE INVENTION

A wildlife feeder for resting on the ground placement has a hopper with downwardly sloping bottom walls, generally vertical hopper side walls, and a top wall. The wildlife feeder has legs for engaging the hopper side walls to support the hopper above the ground. A manifold having a longitudinal axis is mounted to the bottom of the hopper and depending generally vertically downward from the sloping bottom walls of the hopper. The manifold has a mouth at an upper end thereof and a feed supply opening at the bottom end thereof and a cross-section. A head for engaging the manifold is provided with a plurality of feed troughs. The head receives palletized, grandular or particulate feed from the feed supply opening of the manifold at a bottom end of the manifold. The head comprises a horizontal floor, generally laying in a horizontal plane, the floor being perpendicular to the longitudinal axis of the manifold. Each feed trough has a bottom wall, a pair of side walls and a top wall. The floor has a perimeter, the perimeter joining the bottom walls of the feed trough. The bottom walls of the feed troughs transcribe an angle with respect to the floor of the head that may, in one embodiment, be between about 5-30°. The top walls of the feed troughs transcribing an angle that may, in one embodiment, be of between about 110-155° with respect to the longitudinal axis of the manifold. The bottom wall may include a recessed upturned lip, the lip having a top edge, the top edge with a height that is preferably below the plane of the tabular floor of the head.

An animal feeder for placement on the ground, the wildlife feeder is provided comprising a hopper having, in some embodiments, a downwardly sloping bottom wall, generally vertical hopper side walls and a top wall that may include a lid. A plurality of legs engages the hopper to support the hopper above the ground or on a trailer or skid. A head engages the hopper directly or through a manifold. The head may engage side walls or bottom walls of the hopper. The head may have a multiplicity of downward and outward depending feed troughs, each having a feed opening to receive particulate feed from the hopper and having a mouth at a removed end thereof. Each feed trough has a flat bottom wall, a pair of flat side walls and a flat top wall. The head receives feed from the hopper. The head typically comprises a floor. In some embodiments, the feed trough bottom walls include a flat first portion at a near end thereof, which first portion is substantially parallel to the top wall and a second, smaller in area, non-parallel, flat portion that is angled up, towards the top wall. Some embodiments have only the non-parallel portion as the bottom wall. Each of the feed trough bottom walls includes at the mouth, an upturned lip, each upturned lip having a top edge.

BRIEF DESCRIPTION OF THE DRAWINGS

FIG. 1A illustrates a conical hopper with conical bottom walls and a conical manifold leading to a novel head 28.

FIG. 11 is a side view with the internal structure ghosted in of a head for use with Applicant's feeder.

FIG. 12 is a side view with the internal structure ghosted in of a head for use with Applicant's feeder.

FIG. 13 is a side view with the internal structure ghosted in of a head for use with Applicant's feeder.

FIG. 14 is a sectional side view of a head for Applicant's animal feeder.

FIG. 14A is a sectional side view of a head for Applicant's animal feeder.

FIG. 15A is a top view of the interior showing the floor and bottom walls of the head of Applicant's animal feeder.

FIG. 16 is a side view of an alternate embodiment of Applicant's animal feeder.

FIGS. 17A and 17B are elevational and rear views of a version of Applicant's animal feeder that Includes a trailer.

FIGS. 18A and 18B are elevational and rear views of a version of Applicant's animal feeder that includes a skid.

DETAILED DESCRIPTION OF THE PREFERRED EMBODIMENT

Figure 1:
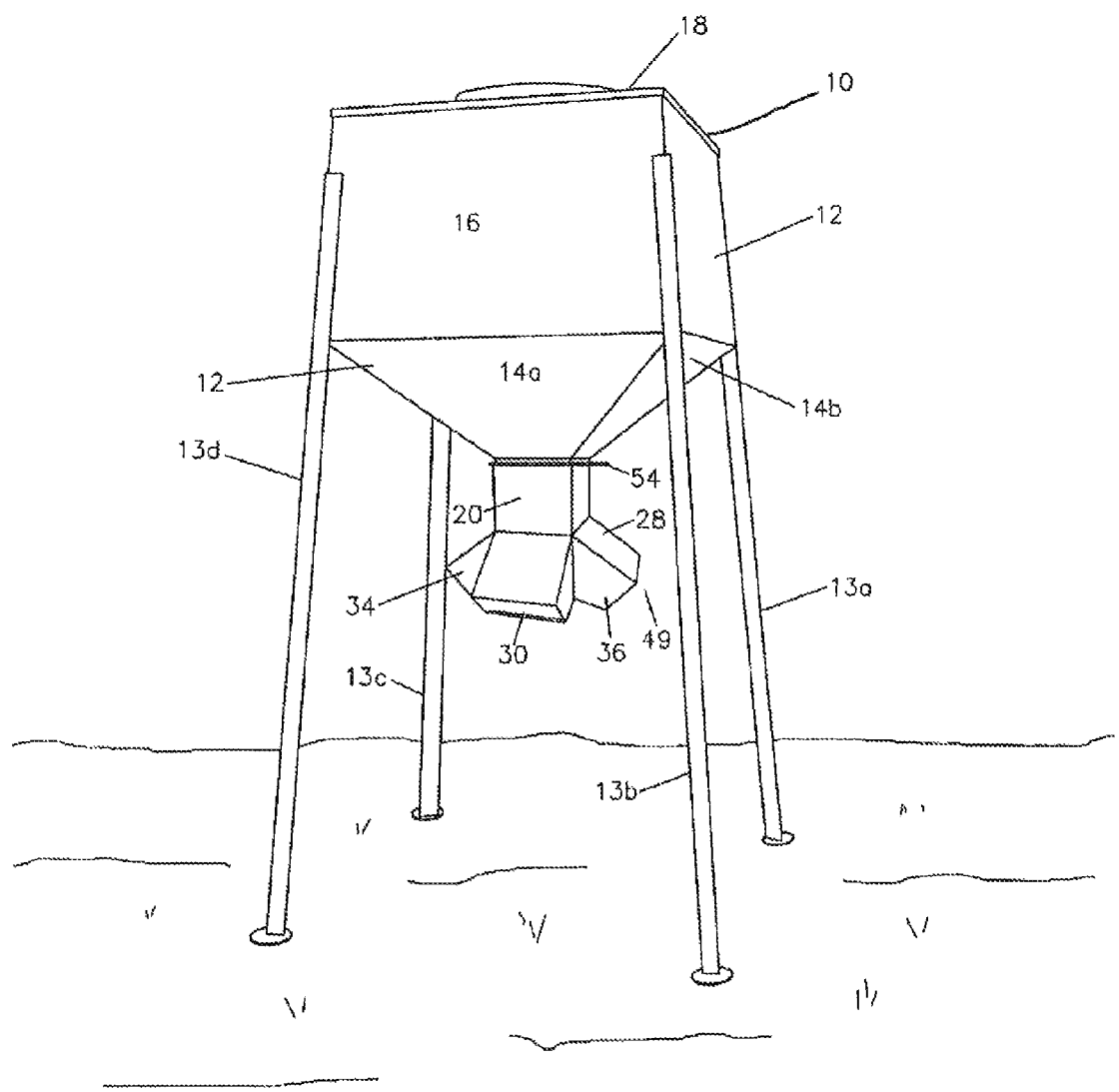
FIGS. 1 and 1A illustrate perspective views of a first and second preferred embodiment of Applicant's wildlife feeder, the difference being that FIG. 1 illustrates a rectangular hopper having rectangular bottom walls and a rectangular manifold leading to a novel head 28.
Figure 1A:
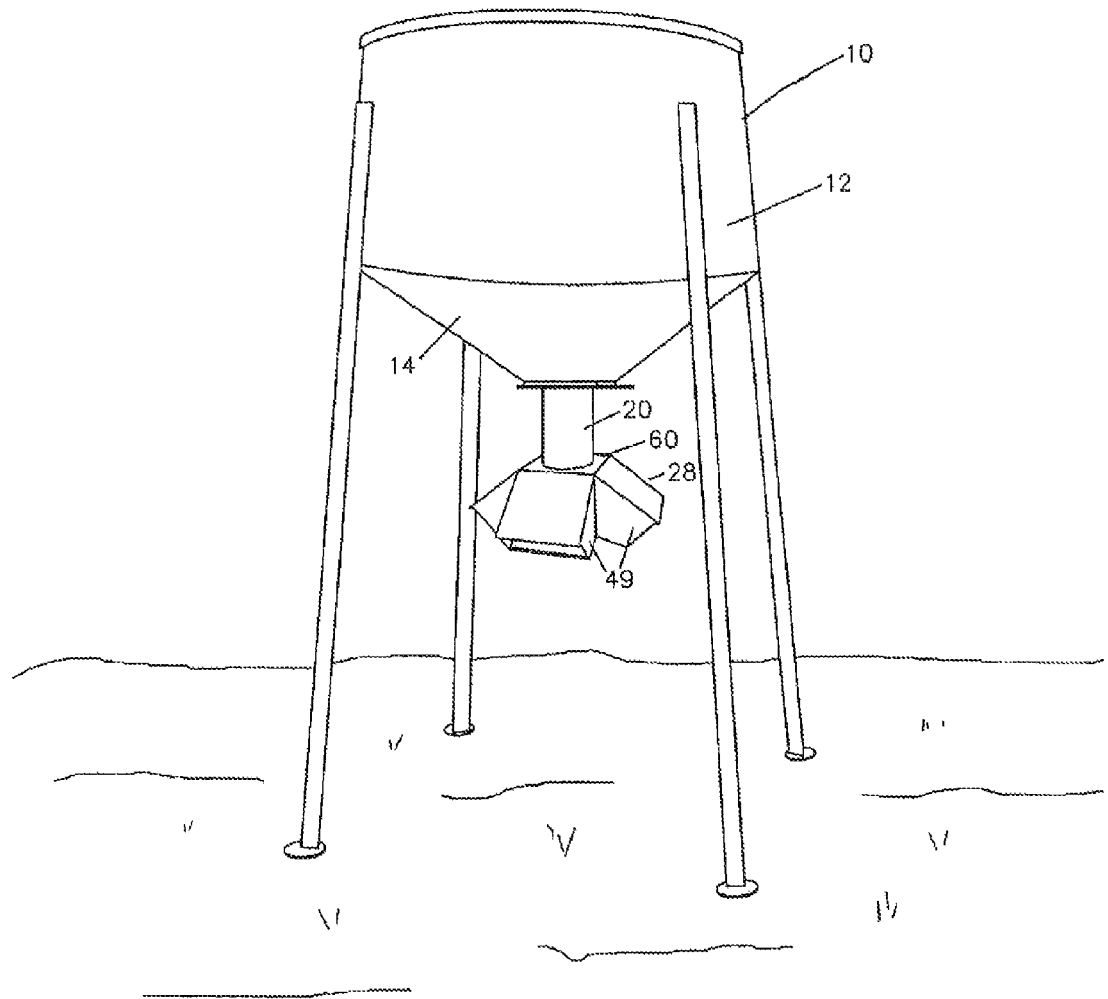

FIG. 1 illustrates a wildlife feeder 10. Wildlife feeders are known in the art to dispense palletized, grandular, and particulate wildlife feed, such as corn, protein pellets, peas, soybeans and nutritional supplements to wildlife, such as deer and elk. Wildlife feeders 10 are typically constructed having a storage hopper section 12 (element 112 in FIG. 9) for retaining and maintaining the feed therein. The hopper 12 is spaced apart vertically above the ground on legs 13a, 13b, 13c, and 13d. The hopper may be generally rectangular in shape as illustrated in FIG. 1, and may include a multiplicity of generally vertical (or slanted slightly outward, see FIG. 9) side walls 16. In alternate embodiments, the hopper may be cylindrical as illustrated in FIG. 1A. The hopper may include a bottom wall 14, typically sloping downwardly from the generally vertical hopper side walls. Bottom walls may be conical (FIG. 1A) or comprised of a number of sections 14a and 14b, as illustrated in FIG. 1 (the two other remaining sections of bottom wall 14 being hidden in the view illustrated in FIG. 1). Hoppers typically include a top wall 18 (element 118, FIG. 9), which may be removable, or fixed to the hopper side walls, in which case there would be an access opening somewhere in the hopper, for example, a small separate lid (not shown) comprising a portion of the top wall.

The sloped bottom walls 14 are seen to engage, in one embodiment, a generally vertically manifold 20 for delivery of feed from the sloping bottom wall at the base of the hopper to a head 28. In one embodiment of wildlife feeder 110, FIG. 9, a head 128 directly engages tabular bottom walls 114a/114b (and those not shown) without a manifold. A short manifold 120 may be see in FIG. 9A and some of those illustrations following FIG. 9A. Turning back to FIG. 1, the head is seen to comprise of a multiplicity of feed troughs, typically one to four, here illustrated as feed troughs 30, 32, 34, and 36. Optionally, a sliding gate assembly 54 (element 154, FIG. 9) as known in the art may be provided between the sloping bottom walls 14/114 of hopper 12/112 and head 28/128. Gate assemblies 54/154 provide structure for controlling the flow of feed from the hopper to the manifold and/or the head.

Turning now to FIGS. 1, 2, 3, 4, and 5, it is seen that manifold 20 may be cylindrical (see FIG. 1A) or rectangular (see FIG. 1) and is hollow. Manifold 20 includes a mouth 22 at the uppermost portion thereof for receiving feed from the upper hopper 12. Generally vertical walls define a throat 24 for carrying feed through the manifold to a multiplicity of feed openings 26. The feed openings and the bottom end of the manifold allow particulate feed to enter the housing. Manifold 20 has a longitudinal axis "A."

Figure 2:
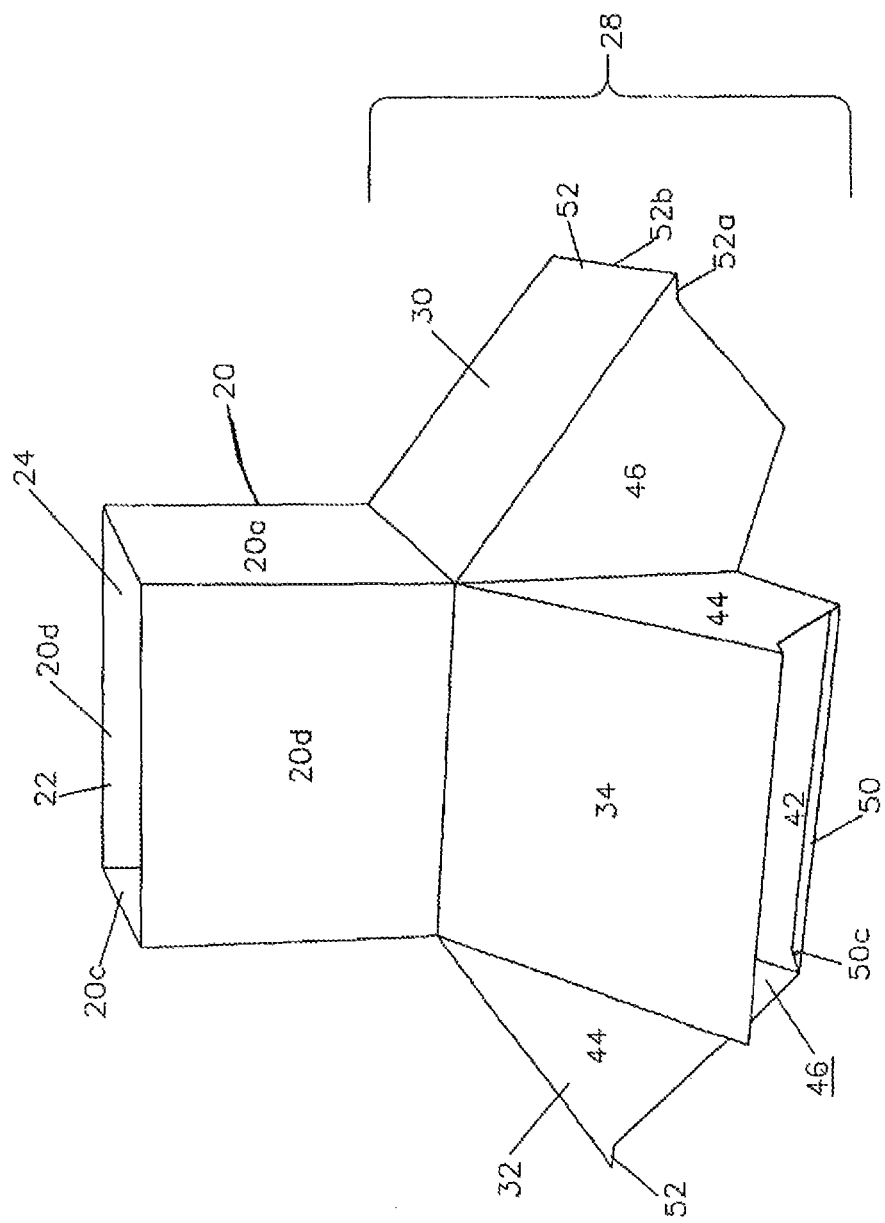
FIG. 2 is a perspective external view of the manifold and head of Applicant's novel wildlife feeder.
Figure 3:
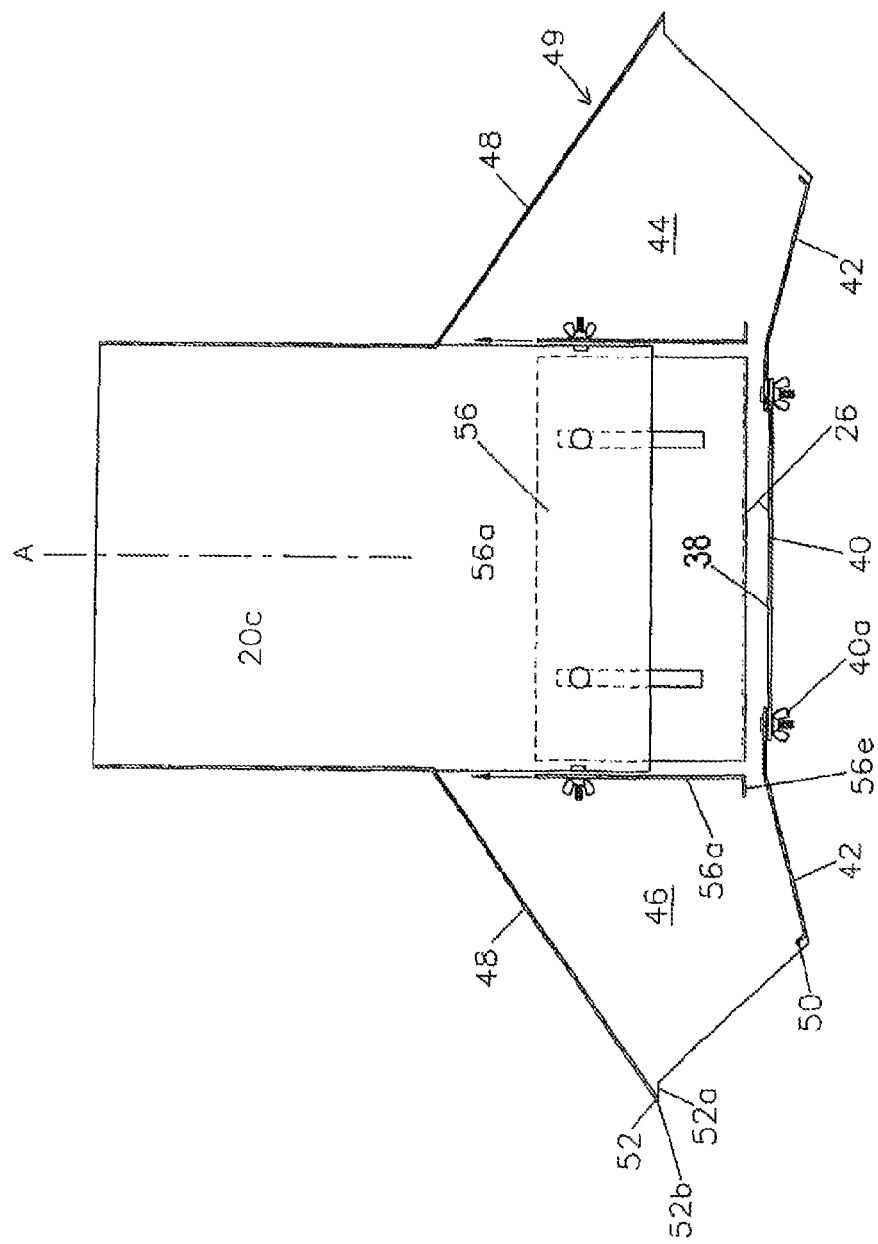
FIG. 3 illustrates a cross-sectional view of Applicant's manifold and head for a wildlife feeder.
Figure 4:
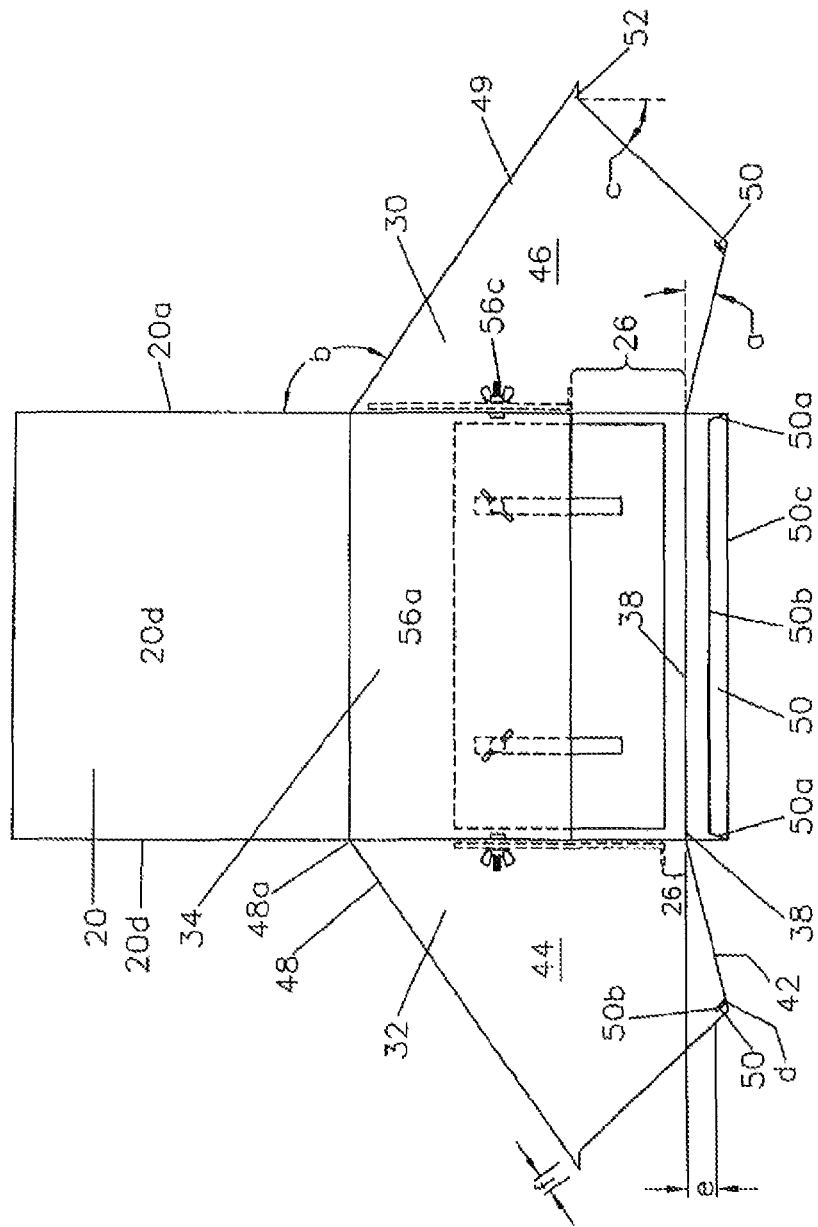
FIG. 4 illustrates a side elevational view of Applicant's manifold and head for a wildlife feeder.
Figure 5:
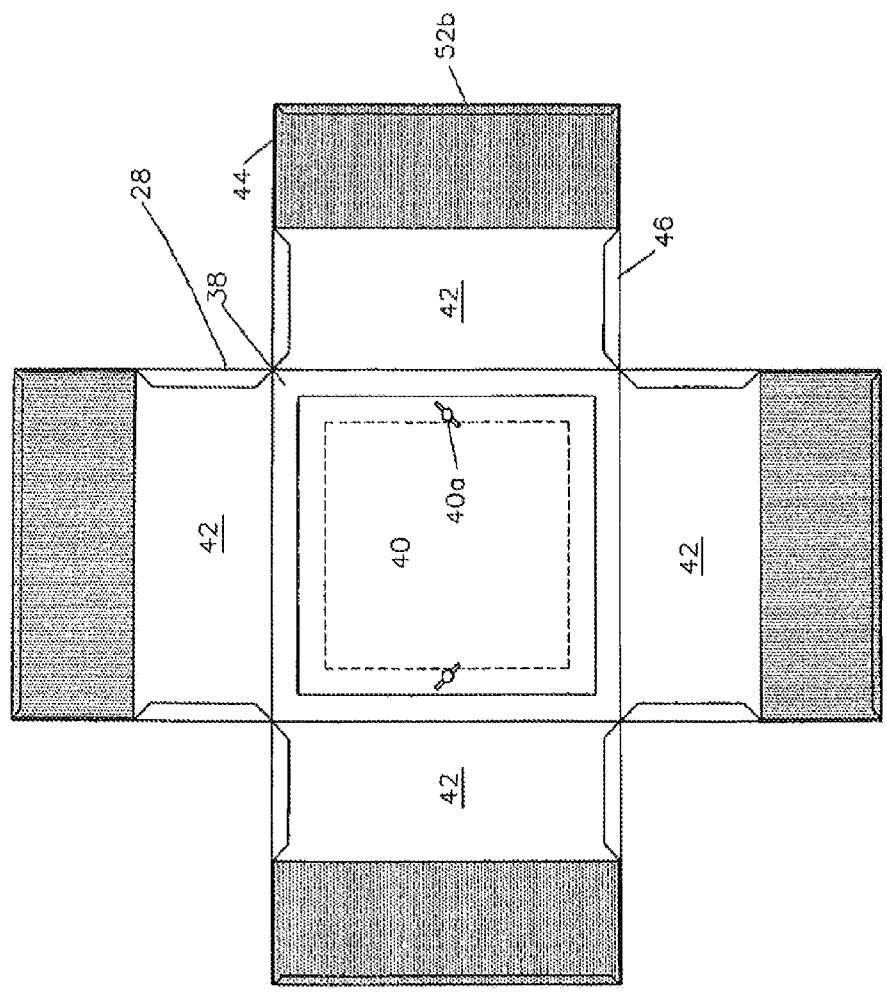
FIG. 5 illustrates a bottom elevational view of the head of Applicant's wildlife feeder.

As seen in FIGS. 2, 3, and 4, head 28 further has a multiplicity of feed troughs 30, 32, 34, 36 extending laterally outward and downward from axis "A". Head 28 is also comprised of a floor 38, which floor is perpendicular to manifold axis A and generally tabular. Floor 38 may include a removable cleanout plate 40, which would typically be held in place by hand engageable fasteners 40a, such as wing nuts. Floor 138 in an alternate embodiment 110, as seen in FIG. 14, may include an upstanding cone or pyramid portion 138a, which may be four walled, or conical, with a wide base that comes to a point 138b. Point 138b is centered beneath a throat 124, or otherwise positioned below the hopper such that particulate feed will be directed to feed openings 126. Fasteners 139 removably attach floor 138 to the head to allow cleanout.

Turning now to the feed troughs, it is seen that the troughs are constructed substantially identical one to the other. Feed troughs are seen to include a tabular bottom wall 42, upstanding side walls 44, 46, and a top wall 48. These walls are designated 142/144/146/148 in FIGS. 9-and 9A, alternate embodiment 110. The four walls collectively may define a feed trough housing 49. The side walls of adjacent feed troughs typically connect to one another (see FIG. 5). The top walls engage the manifold or hopper and the bottom walls engage floor 38. In alternate embodiment 110 (see FIGS. 9 and 9a), bottom wall 142 may include an angled up portion 143, which is not as steep as the non-angled up portion and will act as a feed tray adjacent the mouth 122, so animals can more easily reach the feed.

As seen in FIGS. 1-5, feed troughs 30, 32, 34, and 36 may include a lower lip 50 (150 in alternate embodiment 110), which stands above bottom wall 42. As may be seen in FIG. 4, lower lip 50 may include a pair of lower lip side walls 50a, a lower lip top edge 50b, and a lower lip bottom edge 50c. An upper lip 52 may extend beyond side walls 44 and 46 and may be engaged therewith to oblique upper lip side walls 52a. Upper lip 52 may have an upper lip front edge 52b.

An adjustable baffle assembly 56 may be provided to control the size of the four feed openings 26 in the manner illustrated in FIGS. 3 and 4. For example, FIG. 4 illustrates the adjustable baffle in feed trough 32 (see in side view) is almost closed and that in feed trough 30 is fully opened. Adjustable baffle assembly 56 may be comprised of a fixed plate 56a with a movable baffle plate 56b engaged therewith. Movable baffle plate 56b is seen to have a pair of slots 56d through which fasteners 56c (engaged to fixed plate 56a) extend therethrough. Fasteners 56c, such as wing nuts, may be tightened to hold baffle plate 56b to fixed plate 56a once the desired opening is selected, or loosened so that lower edge 56e, defining the upper opening of feed openings 26, may be moved up or down. Alternate embodiment 110 may be seen to have an adjustable baffle assembly 156 (see FIGS. 12, 12A, 13, 13A, for example). As in the earlier embodiment, a fixed plate 156a (which may be mounted to the top wall), moveable plate 156b, fasteners 156c, and slots 156d may be used. In one version of alternate embodiment 110, the plane of the gates and the baffle assembly 156 extend from the junction of angled up portion 143 up to the top wall 148 as seen in FIG. 12.

Adjustable baffle assembly 56 may be omitted, in which case the bottom edge of fixed plate 56a defines a fixed baffle, which has a fixed feed opening 26, the feed opening being the space between the lower edge of 56a as seen in FIG. 4 and the floor 38 (trough 30). Typically, fixed plate 56a is integral with and forms a lower wall portion of manifold side walls—that is, manifold side walls typically extend below the point where the trough top walls 40 are attached thereto.

Turning back to FIGS. 2, 3, and 4, details of some of the structure of housing 49 may be appreciated. The lower lip 50 (element 150 in FIG. 9) is designed to both prevent access of rain into the housing, but also to stack up particulate feed matter there behind. Moreover, it is seen with respect to FIG. 4 that a distance e may be provided, which distance e is the distance between the plane of floor 38 of head 28 and top edge 50b of lower lip 50, typically about ⅛ inch to about ¾ inch. It is typically provided that top edge 50b of lower lip 50 is below the plane of bottom wall 30a, typically at least about ⅜ inch. This will prevent the water or moisture that may accumulate behind lower lip 50 from creeping up, as by capillary action in the feed or the like, onto floor 38 and into any feed that may be resting on the floor or in the manifold.

It is further seen that lower lip 50 may be spaced back from a front edge of bottom wall 42 and the side wall front edges of the housing 49. This distance d may be between about ¼ inch and about ½ inch. Spacing the lower lip back from the side wall front edges helps keep moisture out of the housing. The removed ends of lower lip 50 may include side walls 50a that are spaced apart from adjacent feed trough side walls 44, 46 to leave a gap, a small gap, for moisture or the like that may collect behind the lip to seep out.

Likewise, upper lip 52 may extend beyond the side walls a distance of 1/16 inch to greater than one inch as designated "f" in FIG. 4. Upper lip 52 is adapted to help keep moisture out of the housing.

Angular relationships may be appreciated with reference to FIGS. 2, 3, and 4. Angle "a" is designated as the angle between the plane of bottom wall 30a and the bottom walls 42 of the feed trough and is typically designed to provide a sufficient angle to deliver particulate feed, under the impetus of gravity, to lower lip 50, but not be too steep for the particulate feed to overflow excessively. An angular range of 5 to 45° may be provided with a preferred range of 5 to 20°, of the more preferred range of 12-17°, preferred 15°.

Angle "b" defines an angle between axis "A" or vertical side wall of the manifold and top wall 48 of housing 49. Angle "b" should be steep enough to prevent animals, such as raccoons, from perching thereupon (and robbing feed) and be steep enough to shed water easily. Angles "b" have been found to be suitable in the preferred range of, but not limited to, 130 to 140°.

Angle "c" is the angle of cutback between the vertical axis A and the front edges of side walls 44 and 46. Such an angular cutback is preferably in the range of, but not limited to, 30 to 60°, and most preferably about 45°. This angle is preferably sufficiently large to provide, in conjunction with lip 52, sufficient overhang to keep particulate feed in housing 49 dry. On the other hand, the angle should not be so excessive that it would prevent access for the muzzle of an animal, such as a deer, to enter the mouth of housing 49, so as to obtain particulate feed therein.

Figure 6:
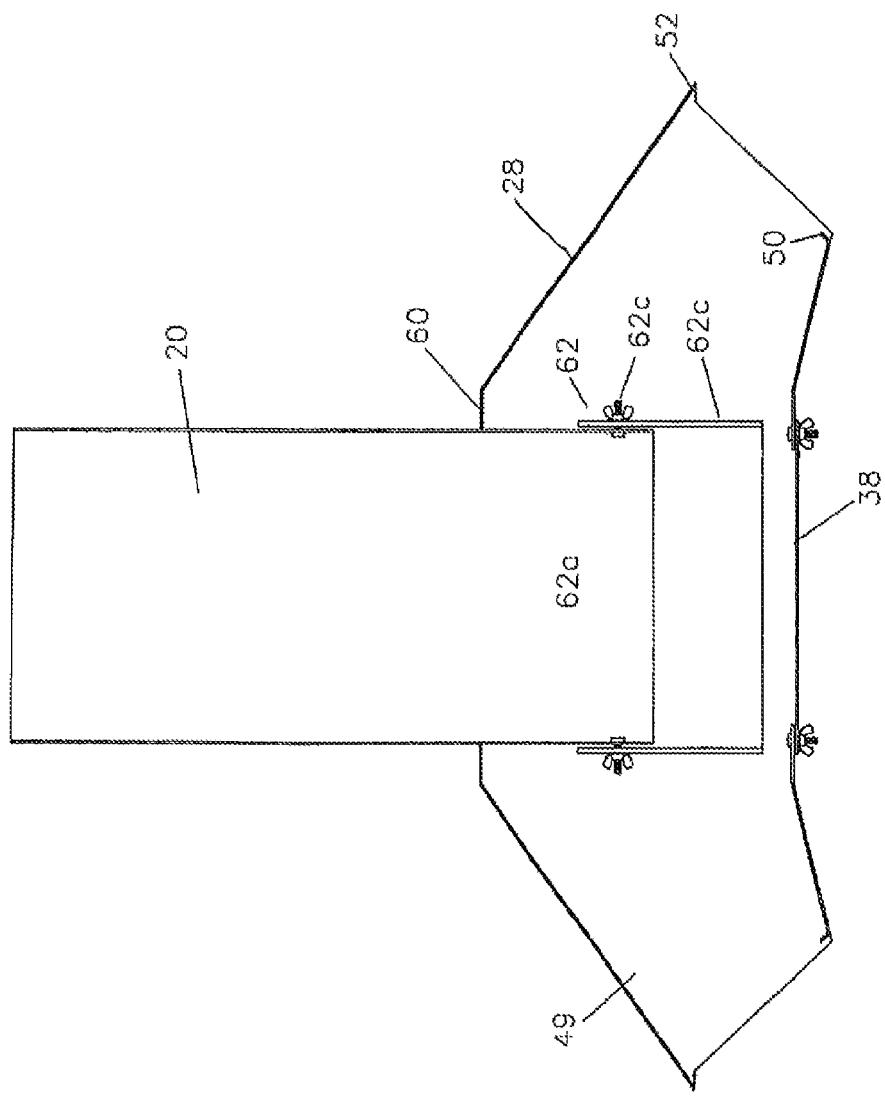
FIG. 6 illustrates a cross-sectional view of Applicant's wildlife feeder having a round manifold engaging head through the use of adapter plate.
Figure 7:
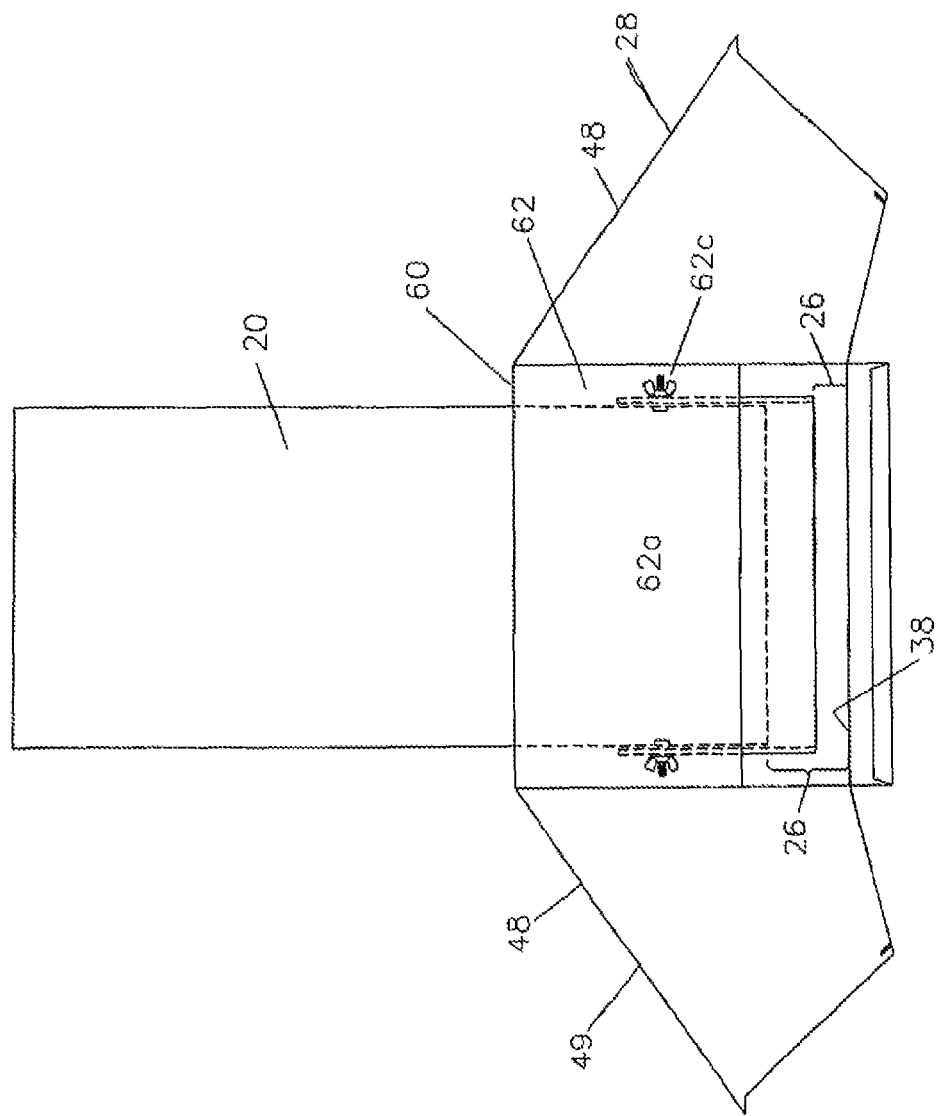
FIG. 7 is a side elevational view of the alternate preferred embodiment of the manifold and head assembly as set forth in FIG. 6.
Figure 8:
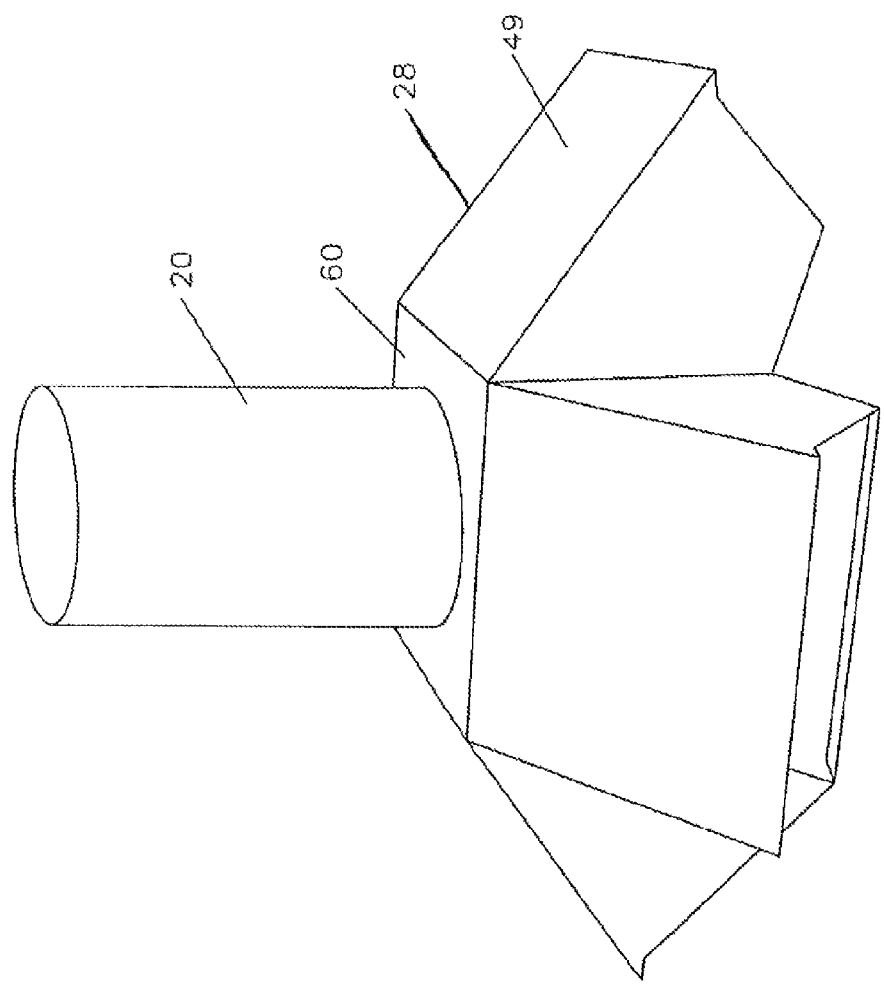
FIG. 8 is an external perspective view of the manifold and head of the embodiment set forth in FIGS. 6 and 7 above.

FIGS. 6-8 illustrate an alternate preferred embodiment of Applicant's device having a round (cylindrical) shaped manifold, connected through the use of an adapter plate 60, which may form a part of head 28. That is to say, an adapter plate is provided to adapt the top wall of the housing to a cylindrical rather than a rectangular shape.

Further, it may be seen that a cylindrical manifold may extend below the adapter plate so as to provide a single cylindrical fixed plate 62a as part of an adjustable baffle assembly 62 that will serve the same function as adjustable baffle assembly 56 in the embodiments illustrated in FIGS. 2, 3, and 4.

Cylindrical fixed plate 62a therefore extends well below adapter plate 60 and well below top wall 48 of housings 49. Fasteners 62c are provided in slots (not shown) typically two, of baffle plate 62b, the two slots are typically 180° apart. Fasteners 62c are mounted to cylindrical fixed plate 62a and extend through the slots so a wing nut or the like of fasteners 62c may be tightened down when the desired height of manifold feed opening 26 is reached. Two such heights are illustrated in FIG. 7 as manifold feed openings 26. Moreover, if an adjustable baffle assembly 62 is not used, the bottom edge of cylindrical fixed plate 62a may act as a fixed baffle and deliver feed to the floor 38. Pressure of the particulate feed will work the feed into the housings 49. As an animal eats the particulate feed out of the lower end of the housing, more will flow from the hopper through the manifold to the floor and through manifold feed opening 26 (whether fixed or adjustable).

FIGS. 9-16 illustrate an animal feeder 110 with some similarities to the feeder illustrated in FIGS. 1-8, and some differences. Wildlife feeder 110 is seen to include a hopper 112 adapted to receive particulate feed and typically supported above the ground on legs 113a/113b/113c/113d or on a trailer, skid or other suitable structure. A head 128 having a multiplicity of feed troughs 130/132/134/136 is provided. Head 128 may directly engage hopper 112 as seen in FIGS. 9, 16, 17A, 17B, 18A, and 18B, or may engage hopper 112 indirectly, through the use of a manifold 120, which will direct the particulate feed matter from the interior of the hopper to the feed openings 126 of the feed troughs of head 128.

Feeder 110 may include a floor 138, which is that portion of head 128 that is below manifold 120 or other opening engaging the hopper and directing feed from the bottom of the hopper to the feed troughs. Floor 138 may be flat or may have a pyramid or cone portion 138a with a point 138b (or may be a combination of the two), which point may be centered along a longitudinal axis running through the manifold or other opening, which axis runs through the slanted bottom walls 114a/114b. This axis generally defines the gravitationally induced by particulate feed flow and it represents, in one embodiment, the confluence of the four bottom walls of the hopper.

FIGS. 9A, 10, 11, and 12 illustrate novel bottom wall 142 of the feed troughs, which bottom wall 142 includes, in one embodiment, an upper portion 148a and angled up or tray portion 143, which is typically non-parallel with the top wall. Wall upper portion 142a is substantially parallel to top wall 148 and is separated by parallel side walls 144/146. However, near the removed end of the feed trough, bottom wall 142 breaks sharply and angles up as seen, for example, in FIG. 11, thereby comprising an angled or tray portion 143, here seen to be almost horizontal and, in one embodiment, making an angle down of about 6° with the horizontal, preferably in a range of 2-12°. The angled or tray portion 143 typically extends back a distance Db from the front edge of the mouth, as seen in FIG. 12, which distance is preferably about 12 inches and may be in the range of about 6 to about 18 inches. Careful observation and experimentation has determined that these dimensions allow an animal's snout (not shown) to reach in sufficiently to receive particulate food matter that may fall back from the mouth.

In a preferred embodiment, a baffle assembly 156 may be provided, which baffle assembly may be located in the feed trough between a feed opening 126 and a mouth 122, in a preferred embodiment, where the break between upper portion 142a and angled up or tray portion 143 occurs. As in previous embodiments, baffle assembly may comprise a fixed plate 156a engaging the top and/or side walls and a movable plate 156b engaging the fixed plate and configured to ride up and down on a pair or more fasteners 156c on slots 156d in moveable plate 156b, so as to adjustably open an opening in the feed troughs by which particulate matter being carried under the impetus of gravity along the bottom wall of the feed troughs can pass therethrough to the mouth. Fasteners 156c may include wing nuts facing mouth 122.

Floor 138 may include a cleanout plate 140 with fasteners 140a engaged therewith. In one embodiment, a pyramid or cone portion 138a may have a flat perimeter portion as seen in FIG. 11. In FIG. 12, floor 138 is seen to comprise just a pyramid or cone portion 138a, which side walls (four for the pyramid, see FIG. 15A) continue straight into the bottom walls of the feed troughs. Compare FIG. 14A to FIG. 11, for example. (See also FIG. 15.)

Figure 9:
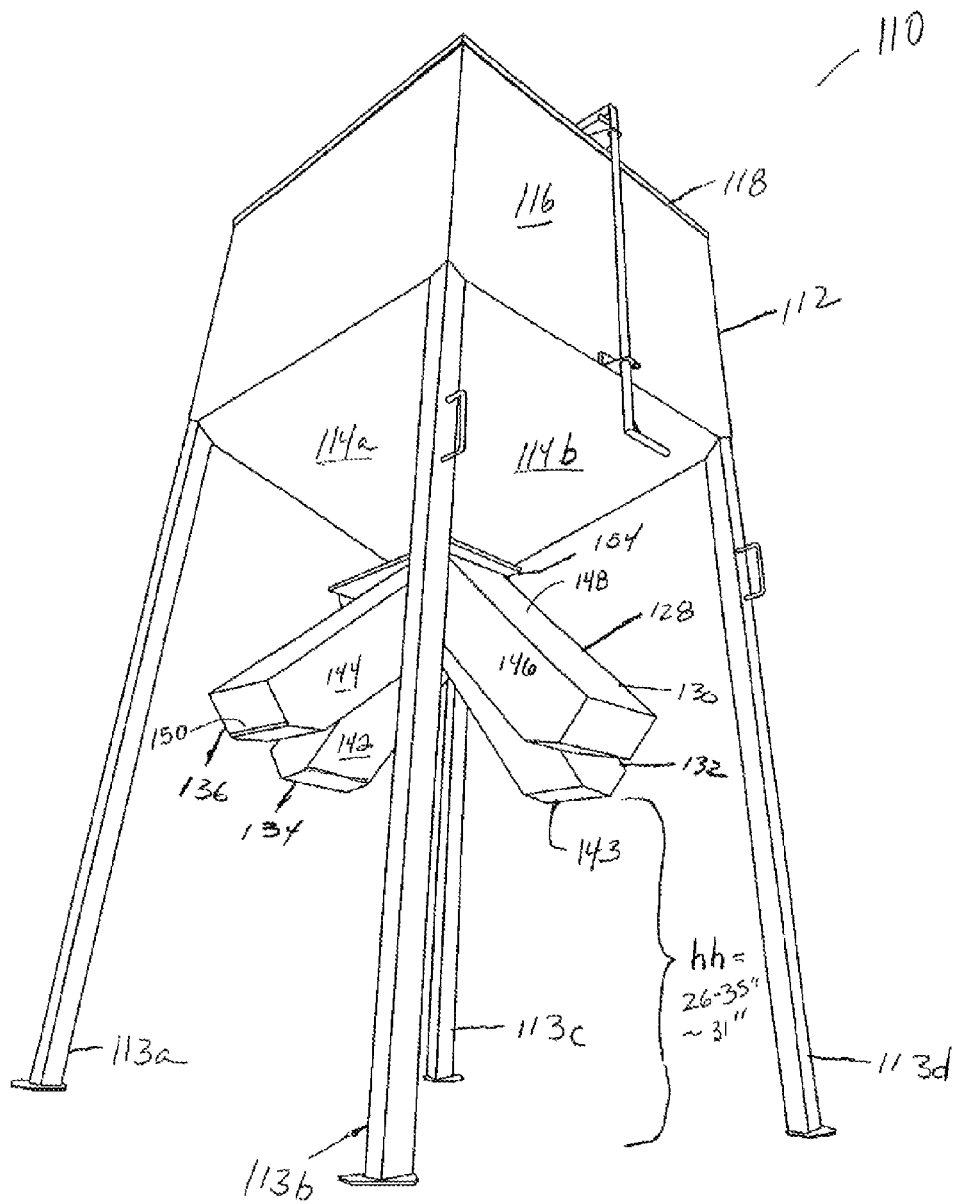
FIG. 9 is a perspective exterior view of an alternate preferred embodiment of Applicant's animal feeder.
Figure 9A:
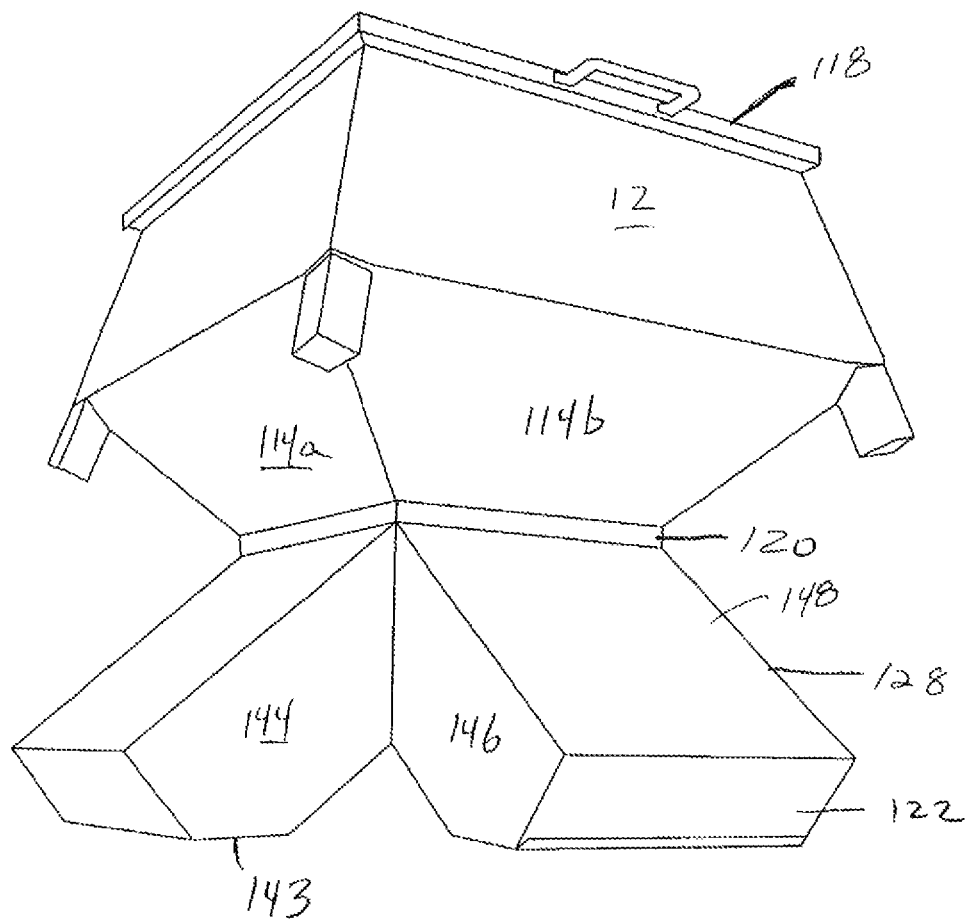
FIG. 9A is a perspective partial view of the hopper and head of Applicant's alternate preferred embodiment.
Figure 10:
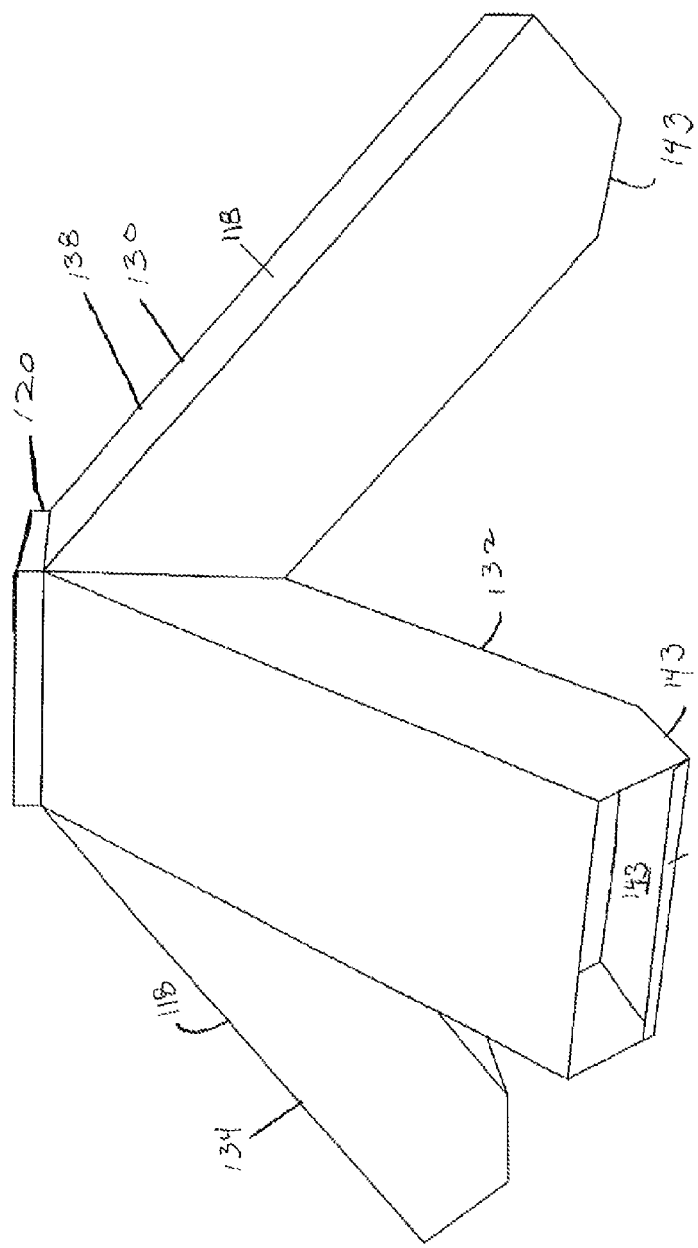
FIG. 10 is a perspective partial view of the hopper and head of Applicant's alternate preferred embodiment.
Figure 15:
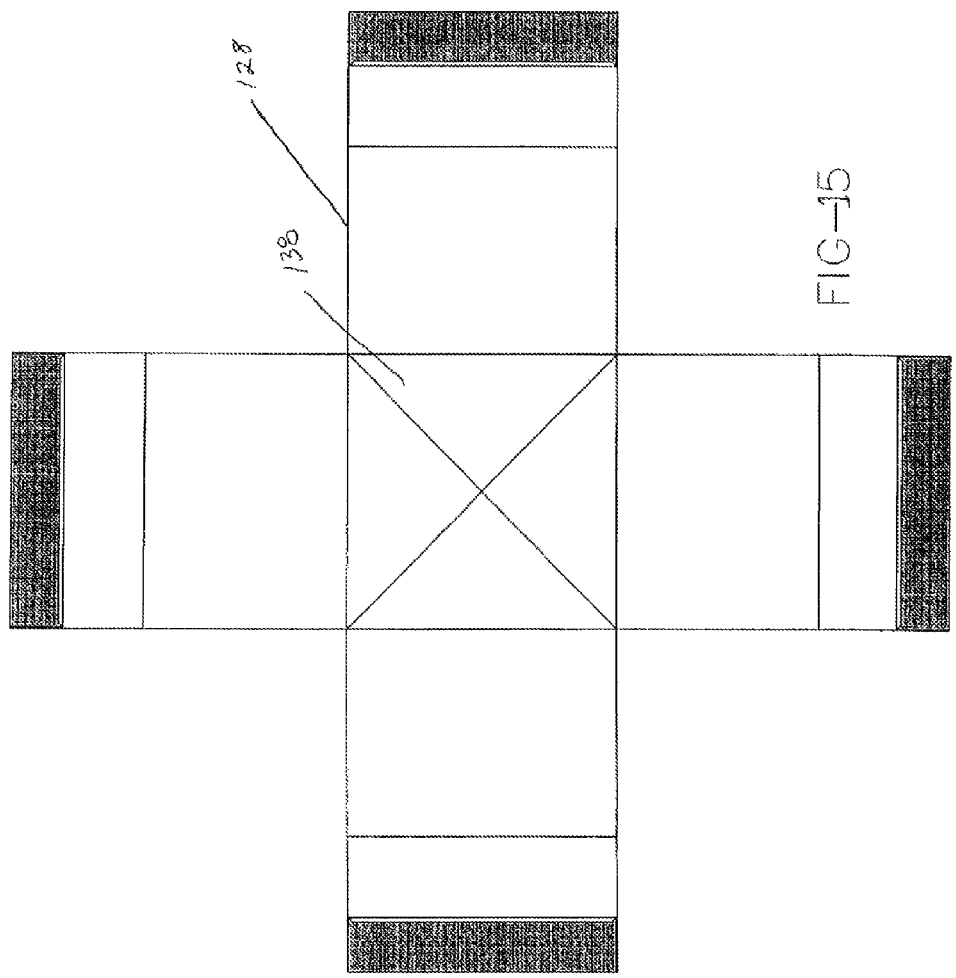
FIG. 15 is a top view of the interior showing the floor and bottom walls of the head of Applicant's animal feeder.

FIG. 9 illustrates that the lower edge of the mouth may be positioned above the support surface a distance Hh, that is in the preferred embodiment, about 31 inches and in a preferred range, about 26 to 35 inches, and preferably less than about 41 inches above the support surface. Careful observation and experimentation has shown this preferred height and these ranges to be preferable for feeding for certain animals, including non-wildlife (domestic), such as cattle. Applicant has found that by carefully controlling and positioning the height encourages cattle to feed and discourages varmints or rodents from having access to the feed troughs.

FIG. 16 illustrates an alternate preferred embodiment of Applicant's wildlife feeder 110 in which feed troughs of head 128 directly engage side walls 116 of hopper 112, such that floor 138 of head 128 acts as a floor of the hopper, which has no bottom walls, and baffle assemblies 156 are used to control the feed flow from the hopper to the mouth of the feed troughs. In any of the embodiments illustrated, a gate assembly 154 may be used between the head and the hopper and may be part of the manifold, if used.

Figure 17A:
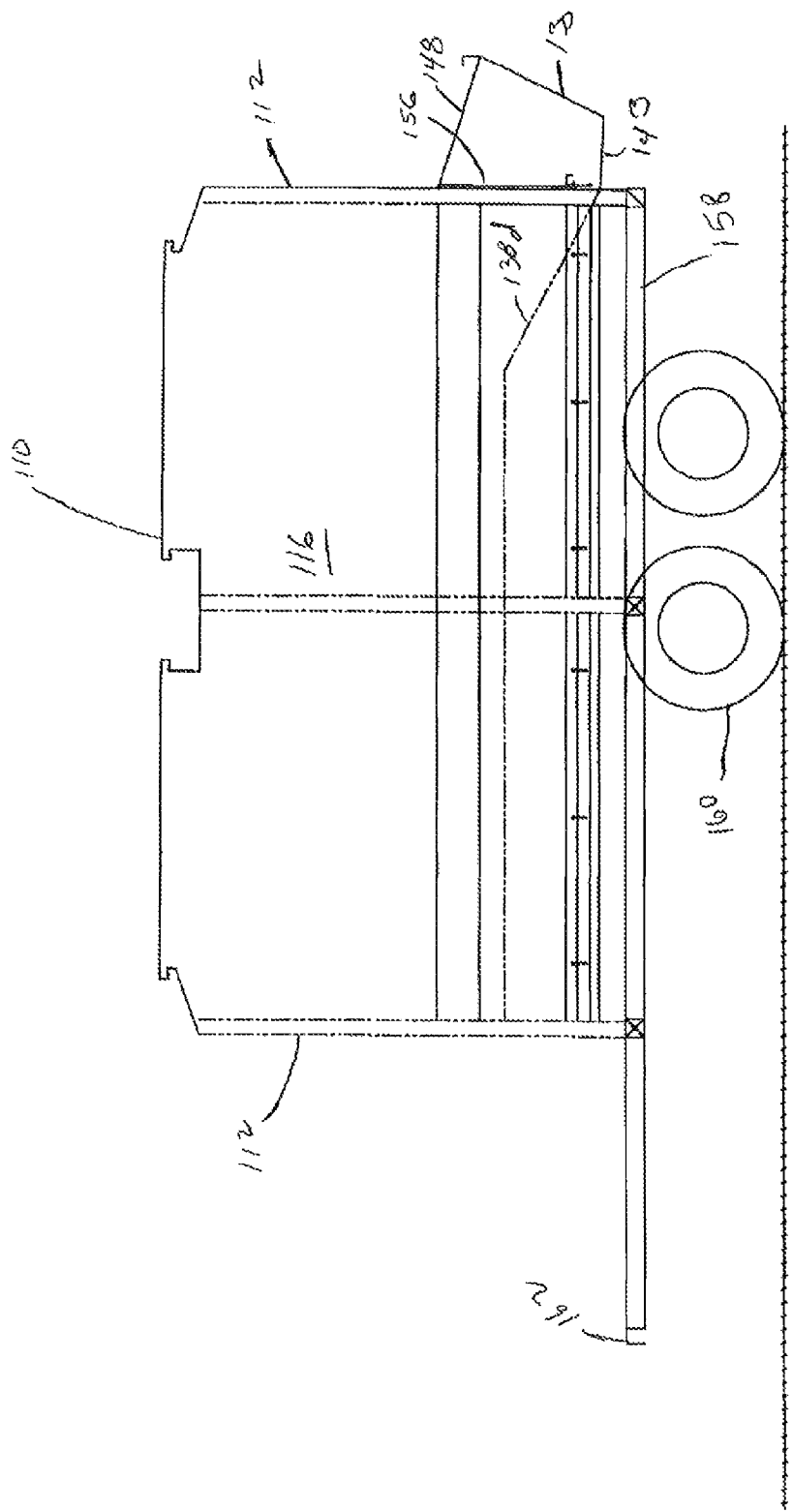

In FIGS. 16, 17A, 17B, 18A, and 18B it is seen that the top wall and the bottom walls of the trough may be non-parallel and that the bottom wall may not contain a parallel first portion like the previous embodiments, only a non-parallel portion or tray portion 143. FIG. 17A illustrates that alternate embodiment 110, similar to that in FIG. 16 or in any of the earlier figures, may be mounted to a trailer 158 having wheels 160 and a hitch 162 of some sort. Hopper 112 may be mounted directly or indirectly to a frame of the trailer and side walls 116 may have head 128 directly engaged therewith. In one embodiment, this may include three feed troughs 130/132/134, one directed off the rear of the trailer and two directed off the two sides of the trailer. The trailer may be hitched to a tow vehicle, taken to a feed store where the hopper is loaded up with feed. It may then be pulled by the tow vehicle directly into a pasture or other location where animal life, including cattle, may feed directly from the trailer borne hopper and head assembly. In an alternate embodiment, instead of the trailer, a skid 163 may be provided (FIGS. 18A and 18B).

FIGS. 17A, 17B, 18A, and 18B illustrate the use of floor 138 comprising an elongated pyramid wherein, instead of a point (in three dimensions), there is a wedge-shaped section 138c directly beneath part of the hopper, it also functions as the bottom wall of the hopper (and the floor of the head) to push particulate feed to the two side heads 132/134 and slanted portion 138d that will urge particulate feed directly to the rear head, here designated with element 130. The wedge is intended to be included in the term "pyramid," and the point may be a two-dimensional point and thus cover the wedge shape as seen in FIGS. 17A and 17B. Baffle assemblies 156 may be in the feed openings (as seen in FIGS. 17A and 17B) or anywhere else in the feed troughs.

It is seen in FIGS. 16, 17A, 17B, 18A, and 18B, that the top and bottom walls of the trough are not parallel and the bottom wall contains only tray portion 143 with the dimensions set forth hereinabove. Floor 138 acts as the floor or base for the hopper instead of the hopper bottom wall configuration in FIGS. 1-16. While the floor here is part of the head, it also acts as a floor of the hopper as it will support grain held in the hopper.

Although the foregoing specific details describe a preferred embodiment of this invention, persons reasonably skilled in the art will recognize that various changes may be made in the details of this invention without departing from the spirit and scope of the invention as defined in the appended claims. Therefore, it should be understood that this invention is not to be limited to the specific details shown and described herein.

The invention claimed is:

1. An animal feeder for placement on the ground, the wildlife feeder comprising:
   a hopper having a generally vertical hopper side walls and a top wall;
   a plurality of legs engaging the hopper to support the hopper above a support surface;
   a head engaging the hopper, the head having a multiplicity of depending feed troughs, each having a feed opening to receive particulate feed from the hopper and having a mouth at a removed end thereof, wherein each feed trough has a bottom wall, a pair of flat side walls and a flat top wall, the head receiving feed from the hopper, wherein the head further comprises a floor, wherein the floor has a perimeter,
   wherein each of the feed trough bottom walls includes a flat portion non-parallel to the top wall, that is angled up, towards the top wall; and
   wherein each of the feed trough bottom walls includes at the mouth, an upturned lip, each upturned lip having a top edge.

2. The feeder of claim 1, wherein each of the bottom walls of the feed trough includes a flat first portion at a near end thereof, which first portion is substantially parallel to the top wall.

3. The feeder of claim 2, wherein the floor includes fasteners and is removably engaged to the head so as to provide cleanout.

4. The feeder of claim 2, wherein the floor includes an upturned pointed portion positioned below a particulate feed flow path originating at the hopper.

5. The feeder of claim 2, further including a manifold engaging the hopper to the head and placing the head below the hopper, the manifold to carry particulate feed from the hopper to the head.

6. The feeder of claim 5, further comprising a gate engaging the manifold for controlling the amount of feed entering the head from the hopper.

7. The feeder of claim 2, further including an adjustable baffle assembly for engaging each trough for the controlling the flow of particulate feed to the mouth of the trough.

8. The feeder of claim 7, wherein the adjustable baffle assembly is located at the junction of the first and non-parallel portions of the bottom wall.

9. The feeder of claim 2, wherein the feed trough side walls make, with respect to the longitudinal axis of the wildlife feeder, an angle in the range of about 30 to 60 degrees.

10. The feeder of claim 2, wherein the floor is at least partly tabular and includes fasteners to provide for cleanout.

11. The feeder of claim 2, further including a manifold between the hopper and the head and wherein the cross-section of the manifold is circular or rectangular.

12. The feeder of claim 2, wherein each feed trough side wall has a front edge that forms an obtuse angle with a front edge of the mouth.

13. The feeder of claim 2, wherein the floor includes an upturned and pointed portion positioned below a particulate feed flow path originating at the hopper; wherein the feed trough side walls make, with respect to the longitudinal axis of the wildlife feeder, an angle in the range of about 30 to 60 degrees; and further comprising a gate for controlling the amount of feed entering the head from the hopper.

14. The feeder of claim 2, wherein the lowest portion of the feed troughs are less than about 41 inches above a support surface on which the hopper rests.

15. The feeder of claim 14, wherein the lowest portions of the feed trough are in the range of about 26 inches to about 36 inches.

16. The feeder of claim 2, wherein the non-parallel portion of the bottom wall of the feed troughs makes an angle of between about 2 and 10 degrees with the horizontal.

17. The feeder of claim 1, wherein the feeder includes a wheeled trailer, wherein the hopper is attached to the trailer.

18. The feeder of claim 17, wherein the lowest portion of the feed troughs are less than about 42 inches above a surface on which the trailer rests.

19. The feeder of claim 1, wherein the feeder includes a ski, wherein the hopper is attached to the skid, and wherein the lowest portion of the feed troughs are less than about 42 inches above the surface on which the skid rests.

* * * * *